Jan. 8, 1952    H. F. BLOOMSTRAN    2,582,000
HAND PROPELLED VEHICLE
Filed Nov. 23, 1948    2 SHEETS—SHEET 1
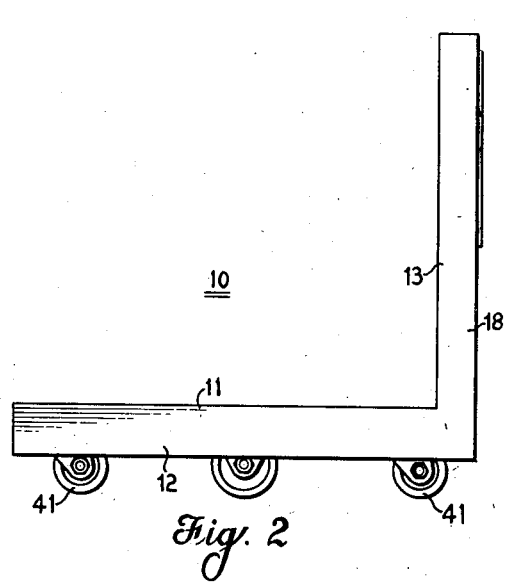
Fig. 2
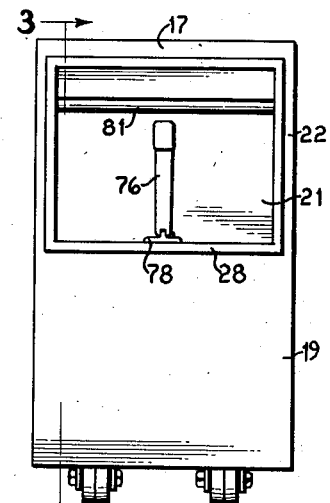
Fig. 1
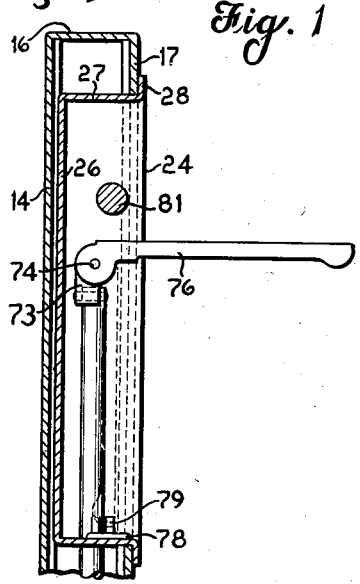
Fig. 3
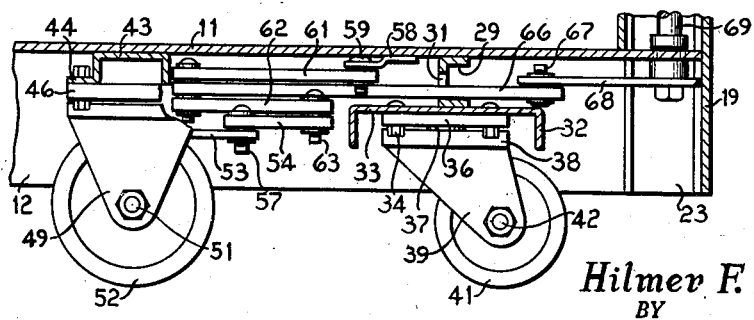
INVENTOR.
Hilmer F. Bloomstran
BY
Richmond S. Hayes
ATTORNEY Jan. 8, 1952  H. F. BLOOMSTRAN  2,582,000
HAND PROPELLED VEHICLE
Filed Nov. 23, 1948
2 SHEETS—SHEET 2

INVENTOR.
Hilmer F. Bloomstran
BY
Richmond H. Hayes
ATTORNEY

Patented Jan. 8, 1952

2,582,000

UNITED STATES PATENT OFFICE 2,582,000

HAND PROPELLED VEHICLE

Hilmer F. Bloomstran, Jamestown, N. Y., assignor to Watson Manufacturing Company, Inc., Jamestown, N. Y., a corporation of New York Application November 23, 1948, Serial No. 61,709

3 Claims. (Cl. 280—48)

1

This invention relates to improvements in push-propelled vehicles of the type used to convey heavy or bulky records or other items about an office or factory.

More particularly, the invention is directed to a vehicle of this type that is utilized to move files, records, etc., into and out of places of storage and is capable of being stored in a restricted area that may exceed the vehicle's dimensions only to an extent sufficient to provide reasonable clearance.

In many offices it is required that records or other items of value be made available for use during business hours and at all other times stored in a protected area, such as a lockable compartment, room or vault. Much difficulty and effort has been experienced in moving such records to and from their places of storage. Of course, the commonly available push-propelled vehicle could be used for this purpose, but such a vehicle has a rather serious inflexibility of use; namely, that it cannot be maneuvered or steered into or out of restricted areas that are of little greater size than the vehicle itself. Where large quantities of valuable records must be handled requiring the use of several push-propelled vehicles, there arises the problem of providing sufficient protected storage space. This concern about storage space is therefore of considerable importance in large offices, since it is evident that large compartments, rooms or vaults that are built to safeguard valuable records may require space that is unavailable. Furthermore, even though a given protected space has already been provided, a further problem is presented when increased protected storage space is needed.

It is a purpose and object of the present invention to provide a hand-propelled vehicle having such operative structure that is manipulatable to such an extent as to be readily storable in a small or restricted area.

Another important object of the invention lies in the provision of a vehicle of the class described that includes manually operable means by which movement in a direction to facilitate storage in a restricted area is made possible. Furthermore this manually operable means enables multiple storage of such vehicles in close or proximate end to end, or side to side relationship.

A further object of the invention lies in the provision of a push-propelled vehicle having one or more wheels that are controllable by an operator to enable direct lateral movement of the vehicle as and when required.

2

Other objects and advantages of the invention will be more fully understood from a consideration of the following specification taken in conjunction with the accompanying drawings; and in which Fig. 1 is a front elevational view of a push-propelled vehicle in which one form of the invention is embodied;

Fig. 2 is a side elevational view of the vehicle shown in Fig. 1;

Fig. 3 is an enlarged fragmentary vertical sectional view taken substantially as suggested by the line 3—3 of Fig. 1;

Figure 4:
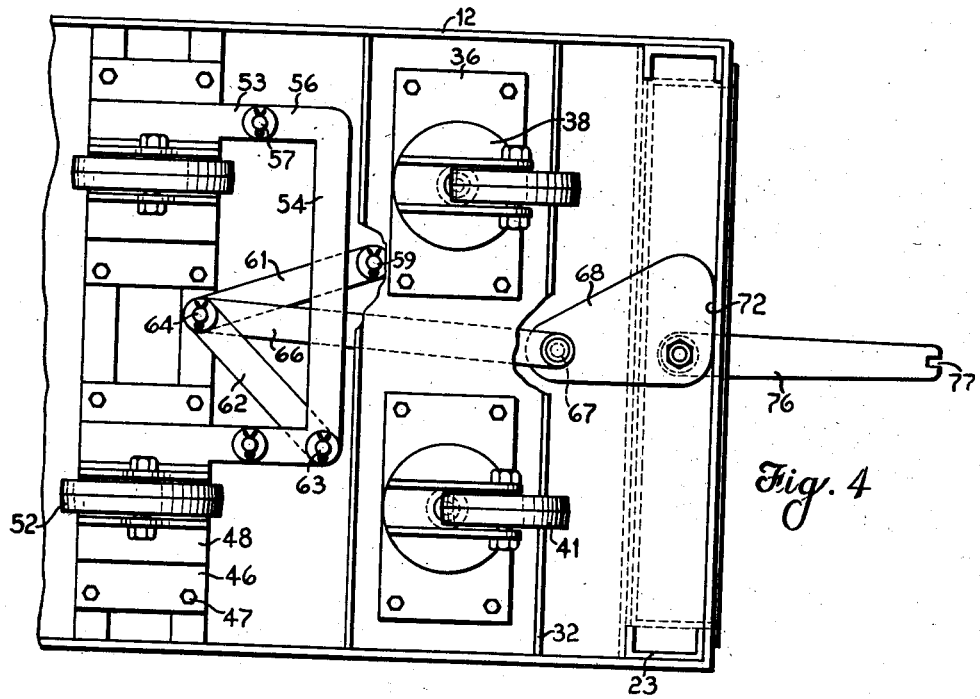
Fig. 4 is a fragmentary bottom plan view showing the rolling structure and mechanism of the invention in normal operative position.

Referring more particularly to the drawing, the reference numeral 10 is employed to generally designate a push-propelled vehicle in which one form of the present invention is embodied. This vehicle comprises a platform 11 from which depend side and end skirts 12 which serve to protect and partially conceal the wheel structure of the vehicle. A hollow panel 13 projects upwardly from one end of the platform 11. This panel includes an upright plate 14. The upper end of the plate is bent to provide a top 16 which may terminate in a short, depending flange 17. The ends of the panel 13 may be formed by flange continuations 18 of the plate 14. As suggested in Fig. 1, a front plate 19 is provided which is formed with a cut out or opening 21 that is approximately half the height of the vehicle end. This opening is defined by flanges 22 and depending flange 17. Channel members 23 may be mounted in and secured to the end flanges 18 of the panel to provide sufficient rigidity to enable an operator to propel the vehicle by merely pushing against any convenient part of said panel. The opening 21 in the front plate 19 may be suitably framed by a rectangular, dished member 24. This member includes a base wall 26, side and end flanges 27 and rim flanges 28, the last mentioned flanges overlapping and being secured to the adjacent portions of the front plate 19 and flange 17.

Figure 5:
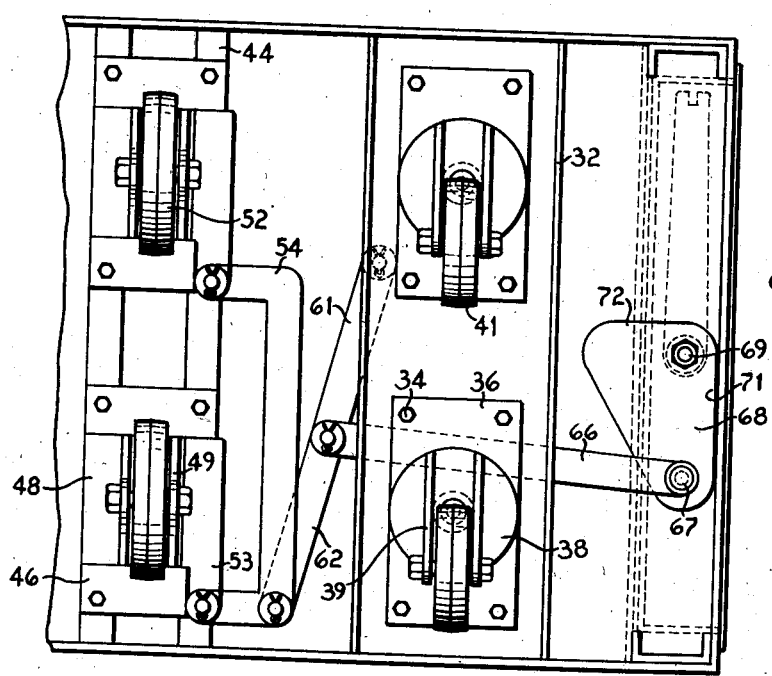
Fig. 5 is a view similar to Fig. 4 showing the mechanism of the invention actuated to enable direct sidewise movement of the vehicle.

In the present showing of the invention it is contemplated that the vehicle will be provided with three sets of wheels. Two of these sets will be caster type and located adjacent the ends of the vehicle. The third set of wheels will be manually controllable as to direction and located between the end pairs of caster wheels. It is common in vehicles of this general type to provide a pair of centrally located, fixed direction wheels and to mount one or more caster wheels at each end. This, of course, enables maneuvering through narrow and tortuous aisles or passageways in an office or factory. In the present disclosure the three sets of wheels, in ordinary movement of the vehicle, serve the same purpose as previously known vehicles of this type. To eliminate unnecessary duplication in the drawing, only one set of swivel or caster wheels are shown in Figs. 3 to 5 inclusive. It will be understood, however, that the other set is in approximately the position being suggested in the small disclosure of the vehicle of Fig. 2.

Extending transversely of and secured to the under surface of the platform 11 are channel members 29. The channel member nearest the panel 13 is formed with a slot 31. Secured to the lowermost flange of each member 29 is a downwardly opening channel plate 32. These plates 32 may extend from one to the other of the skirts 12 of the platform, substantially as suggested in the drawing. Attached to the base wall 33 of each channel plate 32, as by bolts 34, are the base plates 36 for the swivel wheels. A suitable shaft 37 depends from each plate 36 and fits a central opening in the swivel plate 38. Each plate 38 includes a pair of depending arms 39 that, at their lower and off center ends, mount a wheel 41 on a shaft 42. As mentioned, a pair of wheels 41 are provided at the forward end of the vehicle, and a further pair of such wheels, adjacent the rearmost end. A downwardly opening channel 43 is attached to the central, under surface of the platform 11. The sides of this channel terminate in flanges 44 which constitute ledges or seats against which a pair of plates 46 are placed and secured by suitable bolts 47. Plates 46 mount swivel plates 48 in much the manner of the mounting of swivel plates 38 previously described. Centrally of each plate 48 is a pair of depending arms 49 which support a shaft 51 that carries a wheel 52.

Attached to or formed integral with each swivel plate 48 is a laterally extending arm 53. A U-shaped link 54 is provided, the ends 56 of which are pivotally joined, as at 57, to the extended portions of the arms 53. A bracket 58 is secured to the under face of the platform 11 and, through a pin 59, pivotally mounts one end of a link 61. Similarly, the link 54 is joined to one end of a further link 62 by a pin 63. The corresponding ends of links 61 and 62 are pivotally connected with each other and with one end of a swing bar 66 by a pin 64. This bar (Fig. 3) projects through the opening 31 of channel 29 and at this end is joined, through a pivot 67, to one end of a swing plate 68. This plate is preferably of right angle, triangular form in order that, when secured to one end of a shaft 69, the side 71 thereof may serve as a stop to swinging movement of the plate in one direction, and the base 72 as a stop to swinging movement in the opposite direction. The extent of swinging movement of the plate 68 may be clearly noted by a comparison of Figs. 4 and 5 of the drawing.

As may be seen in Fig. 3, the shaft 69 is vertically disposed and projects through the forward end of platform 11 and flanges 27 of member 24, and terminates approximately midway of the opening 21. Mounted on this end of the shaft is a coupling 73 which, through a pin 74, carries a pivotal control handle 76. For convenience in use, the end of the handle is notched, as at 77. On the lower flange 27 of the member 24 is a bracket 78 which is provided with a pair of upstanding lugs 79. One of these lugs, when the handle is in the position shown in Fig. 1, projects into the notch 77, whereas the other lug projects into this notch when the handle is turned ninety degrees in the manner of Fig. 5. In either of these positions the handle is prevented from turning. It is found convenient to extend a cross rod 81 across the space 21 above the handle 76, this rod being positioned at approximately the most convenient height for an operator of the vehicle to grasp when said vehicle is to be moved about.

Having described the structure of the invention, the particular useful advantages thereof will be brought out by way of a description of its operation. With the handle 76 in the position shown in Fig. 1 of the drawing, the centrally disposed set of wheels 52 occupy the position shown in Figs. 2 and 4. In this position of the parts, the wheels 52 serve to support the vehicle for movement in the direction of its length. However, the swivel or caster wheels 41, located at each end of the vehicle, enable full maneuvering thereof even to the extent of turning it in its own length. As heretofore brought out, the particular purpose of the invention is to provide means for moving a vehicle of this type into extremely restricted areas and to accomplish this it is necessary that the vehicle be capable of direct sidewise movement. When such a vehicle has been brought into position adjacent a restricted area, the handle 76 is withdrawn from the recessed area 21, being swung upwardly into the position shown in Fig. 3. In this position, it is swung through a horizontal plane to the right until the end thereof moves into the opening 21, as suggested in dotted line in Fig. 5. Ninety degree movement of the handle rotates shaft 69 and swings plate 68 from the position of Fig. 4 to that of Fig. 5. This movement of the plate draws link 66 forwardly, spreads links 61 and 62, thereby moving the U-shaped link 54 in a direction transversely of the vehicle. Since the swivel plates that support wheels 52 are connected with this U-shaped link, it is apparent that these wheels will be turned ninety degrees and directed transversely of the vehicle as shown in Fig. 5. Although the caster wheels 41, at the ends of the vehicle, may still be in a position for lengthwise movement, it is apparent that they will quickly swing into a position transversely of the vehicle as soon as said vehicle is moved in a sidewise direction. It should be clear from the foregoing description that this vehicle may now be moved directly sidewise into an area that is so restricted as to only allow reasonable end clearance. The mechanism of the invention not only enables the storage of a single vehicle in a closely restricted area, but where a number of such vehicles are required, they are enabled to be stored in such compact arrangement as to eliminate all waste space and, as heretofore mentioned, such space is of importance inasmuch as it is contemplated that vehicles embodying the invention will be utilized in the handling of valuable records and must be stored in locked rooms or vaults.

Although applicant has shown and described only one modification of this invention, it will be apparent to those skilled in the art that variations of the structure set out may be made and are contemplated insofar as such variations are within the spirit and scope of the annexed claims.

Having thus set forth my invention, what I claim as new and for which I desire protection by Letters Patent is:

1. A push propelled vehicle comprising a load carrying body, a panel extending upwardly from one end of said body, swivel wheels located near opposite ends of said body, a pair of intermediate swivel mounted wheels cooperating with said first mentioned wheels to sustain said vehicle, unitary means rigidly connecting said intermediate wheels for simultaneous and equal rotary movement, a lever carried by said panel and movable into either of two positions, a shaft extending downwardly from said lever and terminating beneath said body, linkage operatively connecting said means with said shaft, said linkage including means for abutting the base of said panel upon a 90° turn of said lever in either direction and limiting swiveling movement of said pair of wheels to approximately a ninety degree turn, said lever, through said shaft and linkage, being capable of swiveling said pair of wheels to enable selective movement of said vehicle in the general direction of its length or directly transversely thereto, and other means mounted on said panel for securing said lever in either of said two positions whereby to render said pair of wheels non-swivelable in either of two positions.

2. A push propelled vehicle comprising a load carrying body, a panel extending upwardly from one end of said body, swivel wheels located near opposite ends of said body, a pair of intermediate swivel mounted wheels cooperating with said first mentioned wheels to sustain said vehicle, a U-shaped rigid link connecting said intermediate wheels for simultaneous and equal rotary movement, a lever carried by said panel and movable into either of two positions, a shaft extending downwardly from said lever and terminating beneath said body, a second link having one end pivotally connected to said U-shaped link, a third link having one end pivotally connected with said body and its other end pivotally connected with the other end of said second link at an acute angle, and link means connecting said shaft and the common pivot of said acute-angle-forming links and effective upon rotation of said shaft to flatten out said angle and swivel said intermediate pair of wheels through a ninety degree turn.

3. A push propelled vehicle comprising a load carrying body, a panel extending upwardly from one end of said body, swivel wheels located near opposite ends of said body, a pair of intermediate swivel mounted wheels cooperating with said first mentioned wheels to sustain said vehicle, a U-shaped rigid link connecting said intermediate wheels for simultaneous and equal rotary movement, a lever carried by said panel and movable into either of two positions, a shaft extending downwardly from said lever and terminating beneath said body, a second link having one end pivotally connected to said U-shaped link, a third link having one end pivotally connected with said body and its other end pivotally connected with the other end of said second link at an acute angle, and link means connecting said shaft and the common pivot of said acute-angle-forming links and effective upon rotation of said shaft to flatten out said angle and swivel said intermediate pair of wheels through a ninety degree turn, said link means including a link and a plate pivotally connected thereto, said plate being fixed to said shaft and having at least two edges arranged at 90 degrees with respect to each to engage the base of said panel and limit the rotation of said shaft to 90 degrees.

HILMER F. BLOOMSTRAN.

REFERENCES CITED

The following references are of record in the file of this patent:

UNITED STATES PATENTS

| Number | Name | Date |
|---|---|---|
| 1,279,870 | Hougendougler | Sept. 24, 1918 |
| 1,538,054 | Ohnstrand | May 19, 1925 |
| 1,545,117 | Baldwin et al. | July 7, 1925 |

FOREIGN PATENTS

| Number | Country | Date |
|---|---|---|
| 8,498 | Great Britain | 1907 |